(12) United States Patent
Grau Genesias

(10) Patent No.: US 8,802,753 B2
(45) Date of Patent: Aug. 12, 2014

(54) ADDITIVE FOR PERMEABLE CONCRETES WITH IMPROVED PROPERTIES AND METHOD FOR MANUFACTURING THEREOF

(76) Inventor: Jaime Grau Genesias, Puebla (MX)

( * ) Notice: Subject to any disclaimer, the term of this patent is extended or adjusted under 35 U.S.C. 154(b) by 78 days.

(21) Appl. No.: 13/536,356

(22) Filed: Jun. 28, 2012

(65) Prior Publication Data

US 2013/0165552 A1    Jun. 27, 2013

(30) Foreign Application Priority Data

Jun. 30, 2011    (MX) .................... MX/a/2011/007071

(51) Int. Cl.
  *C04B 24/00*    (2006.01)
(52) U.S. Cl.
  USPC ............... 524/5; 106/696; 106/724; 106/725; 106/727; 106/729
(58) Field of Classification Search
  CPC ...... C04B 24/00; C04B 24/12; C04B 24/128; C04B 24/16; C04B 24/20; C04B 24/2461; C04B 24/283; C04B 24/32; C04B 24/38; C04B 24/42
  USPC ............... 106/696, 724, 725, 727, 729; 524/5
  See application file for complete search history.

(56) References Cited

U.S. PATENT DOCUMENTS 6,660,077 B2 * 12/2003 De Buen-Unna et al. .... 106/692
6,824,605 B2 * 11/2004 De Buen-Unna et al. .... 106/692

FOREIGN PATENT DOCUMENTS

MX        270135        7/2009

OTHER PUBLICATIONS

International Search Report in PCT/IB2012/053263 dated Nov. 19, 2012.

* cited by examiner

*Primary Examiner* — Vu A Nguyen
(74) *Attorney, Agent, or Firm* — Nixon & Vanderhye P.C.

(57) ABSTRACT

An additive for manufacturing permeable concretes with improved properties and method for manufacturing the same are provided. The additive comprises in a total composition: 33.70 to 54.90% water; 0.30 to 0.50% defoamer; 0.30 to 0.40% bactericide; 0.30 to 0.50% polyglycol; 7.20 to 24.00% of a combination of emulsifiers; 15.50 to 17.00% moisturizer; 0.8 to 22.90% dispersant; and 0.70 to 1.00% biopolymer. The additive for manufacturing permeable concretes can be added to any type of stony aggregate and/or cement improving the product's mechanical properties required in each step before, during, and after of the setting.

19 Claims, 3 Drawing Sheets

BASE CONTAINING COMPACTORS

METALLIC CYLINDERS

METALLIC CYLINDERS WITH BASE CONTAINING COMPACTORS

FILLING OF A CYLINDER | CONCRETE WITH INVENTION ADDITIVE | CONCRETE WITH PRIOR ART ADDITIVE

CONCRETE WITH INVENTION ADDITIVE | CONCRETE WITH PRIOR ART ADDITIVE

CONCRETE WITH INVENTION ADDITIVE

CONCRETE WITH PRIOR ART ADDITIVE

ADDITIVE FOR PERMEABLE CONCRETES WITH IMPROVED PROPERTIES AND METHOD FOR MANUFACTURING THEREOF

This application claims priority to Mexico Application No. MX/a/2011/007071, filed Jun. 30, 2011, the entire contents of which is hereby incorporation herein by reference.

FIELD OF THE INVENTION

The present invention is related to an additive for permeable concretes with improved properties and a method for manufacturing thereof, particularly, an additive for permeable concretes which can be added to any type of stony aggregate and/or cement, improving mechanical properties required for the product on each step before, during, and after of the setting.

BACKGROUND

Concrete is the result from mixing hydraulic-activated binding materials, such as cement, with inert solid granular materials with suitable particle size and water. Said mixture consists of moldable slurry with adhesive properties that after setting becomes a stony consistency material.

One of the main features of concrete is its resistance against compression forces; however, its behavior before other forces such as traction, flexion, abrasion, etc. is not the best. In order to modify the concrete's characteristics and behavior, a common practice is to add additives.

Currently, in cement, concrete, and construction industry, in general, environmental awareness has been encouraged, intensifying awareness and actions towards these matters. Environment is a fundamental part of sustainable development to absorb effects of human activity, proposing science and technology improvements.

One of the environmental aspects to be considered is water: groundwater recharge and pollutant elimination. A method used and improved in the last decade for correcting the above mentioned aspects is the use of permeable concretes in roadway. This action allows groundwater recharge, filtration of pollutants towards groundwater, and reducing infectious focus by decreasing ponding.

Previous concrete is a well-known ecological and environmentally friendly material; however, it shows deficiencies in resistance, durability, degradability, etc.

Additives for manufacturing pervious concrete and methods for manufacturing them have taken many forms. For example, in the prior art, Mexican Patent No. 270,135 (Jaime Grau G., et. al.) describes an additive for manufacturing permeable ecological concretes with high-resistance for compression, flexion, and abrasion that allows water filtration to subsoil. Said additive, by being mixed with cement, water and any hard aggregate results in a high-resistance and long-durability concrete. The additive is prepared based on dispersants, binders, moisturizer agents, hydroxypropylethyl cellulose or hydroxypropylmethyl cellulose, and silica aluminates, water, surfactants, bactericides, and defoaming agents.

In addition, in Mexico there is a protection of Patent No. 236,456 from Halliburton Energy Services, Inc. for an improved permeable cement composition including an effective amount of a surfactant. By adding surfactant to permeable cement composition provides at least a pumpable grout with a minimum amount of water or brine.

Document US 2009/0197991 A1 (Construction Research & Technology GmbH) discloses a cement-water composition, and a rheology modifying additive (RMA). By including RMA, the cement composition is improved. The protected composition may include other additives already known in the state of the art.

It is a common practice in the state of art to find patents related to additives for concrete and/or cement compositions, as is the case of U.S. Pat. No. 3,948,672 to Texaco, which grants protection to a permeable cement composition for treating and fixing a permeable concrete film of the barrier between the formation and the well.

U.S. Pat. No. 6,875,265 B1 (Sung Soon Kang), grants protection to an improved high-performance cement including the established amounts of aggregates, cement, water, dyes, charcoal powder, etc. that results in a product with a 120-300 $kgf/cm^2$ compression force and $2\times10^{-2}$ cm/sec permeability coefficient.

It is important to mention that despite the existence of various additive mixtures for manufacturing permeable concretes and/or permeable compositions in the state of the art, several deficiencies exist. There is a need for new additives and/or cement compositions that efficiently solve the following problems:

Additives of the state of the art must be manually added in situ, rather than automatically at the concrete production plants causing that an automatic dosing can not be made and to have in dosage errors due to the manual dosage.

Setting times are short leading to add water continuously and consequently getting out of technical specifications needed for the proper and/or efficient performance of concrete.

Working and/or placing concretes of the prior art in warm weather are complicated at daytime because hot weather substantially affects the admixture, shorting even more setting times and the concrete placement at overnight increases the application costs.

Cement placement requires constantly wetting the base before placing concrete to avoid water absorption, which causes low humidity and consequently cracks on the surface.

For the curing process, once the cement of the prior art is placed, it is required to place polyethylene sheets on the surface. This is a problem because the wind lifts the polyethylene sheets, resulting in bad setting, cracks and decay on concrete surface.

Pervious concrete has poor plasticity and/or handling.

One of the main deficiencies is the use of high percentage of additive with relation to the amount of cement.

Cement of the state of the art is expensive because very high thickness must be used to reach the intended high resistance. Therefore, this cement is only used in low traffic sites like pathways, sidewalks, bicycle paths, parking lots, etc., where high resistance is not critical.

Thus, the above mentioned documents of the state of the art neither disclose nor suggest the composition and/or additive within the scope of the composition discloses in this application, that is an additive for permeable concretes with improved properties, which can be added to any type of stony aggregate and/or cement, improving mechanical properties required for the product on each step before, during, and after of the setting.

OBJECTS OF THE INVENTION

An object of the present invention is to provide an additive for manufacturing permeable concretes with improved properties which can be added and mixed with any type of stony aggregate and with any type of cement.

A further object of the present invention is to provide an additive for manufacturing permeable concretes with improved properties, which provides a composition of permeable concrete that does not absorb a lot of heat as concrete of the prior of the art.

Another object of the present invention is to provide an additive for manufacturing permeable concretes with improved properties in which said additive can be added automatically to the admixture in the plant, reducing logistic and installation costs through easier handling, and allowing the composition packing and transport in different presentations and/or volumes.

A further object of the present invention is to provide an additive for manufacturing permeable concretes with improved properties with an extended handling time of concrete regardless the time of the day (day, night) or hot weather.

A further object of the present invention is to provide an additive for manufacturing permeable concretes with improved properties that increase resistance of any state of the art cement by adding a substantially minor quantity of additive.

A further object of the present invention is to provide an additive for manufacturing permeable concretes with improved properties which increases concrete resistance to over 300 kg/cm$^2$ with less quantity of cement.

Yet another object of the present invention is to provide an additive for manufacturing permeable concretes with improved properties, wherein the concrete curing step does not require the use of polyethylene sheets.

A further object of the present invention is to provide an additive for manufacturing permeable concretes with improved properties, providing a more flexible type of cement than any of prior art permeable concretes.

A still further object of the present invention is to provide an additive for manufacturing permeable concretes with improved properties wherein the cement can set under water helping to decrease costs and times in building piers and offshore platforms.

A further object of the present invention is to provide an additive for manufacturing permeable concretes with improved properties wherein the quantity of additive used in the cement composition is 25% lesser than the quantity of additive of the prior art reaching higher resistances.

Figure 1:
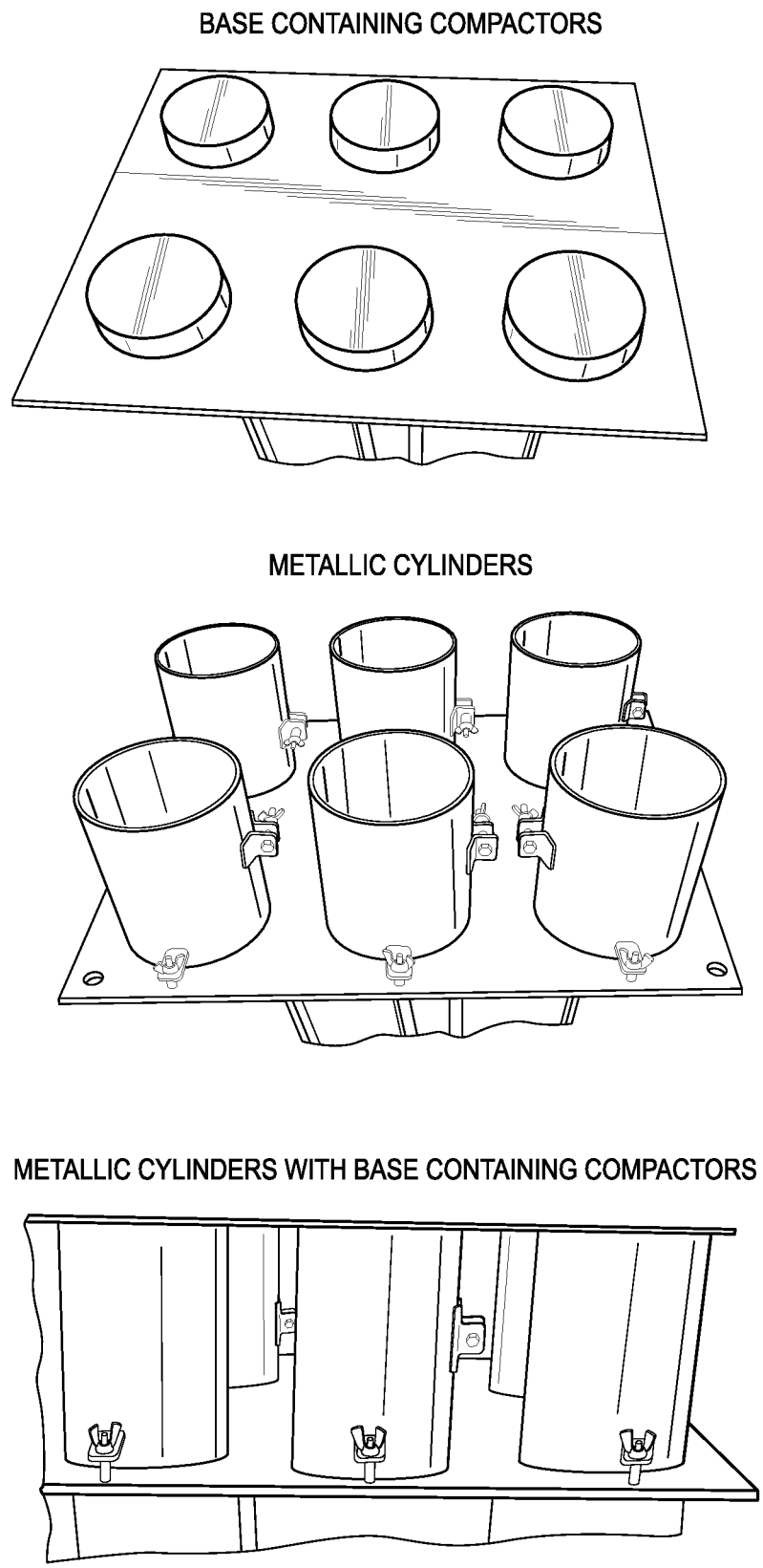
FIG. 1 shows metallic cylinders with their respective fixtures for testing compressive strength.

The purpose and advantages of the present invention will be disclosed and become apparent from the following description as well as they will be evident from practicing the invention. Additional advantages of the invention will be verifiable and they will be reached by the method and procedure particularly indicated in the following detailed description, as well as in the appended claims.

DETAILED DESCRIPTION OF THE INVENTION

The invention is related to an improved additive for manufacturing permeable concretes with improved properties; the additive can be added to any type of stony aggregate and/or cement, improving the mechanical properties required by the product on each step before, during, and after of the setting. The invention is also related to a method for manufacturing said additive.

To obtain a permeable concrete with improved properties with features and advantages described herein, the additive of the present invention is mixed with cement, water, and stony aggregates through conventional processing techniques, although also according to the characteristics of the product to be obtained it is possible to optionally add other ingredients. The above mentioned techniques include, without limitation techniques of plant mixing, in situ mixing, mixing large volumes, manual mixing of small volumes, use of industrial mixer for concrete, mixing trucks, and the like.

Permeable concrete with improved properties includes improved physicochemical properties for each step before, during, and after of the setting. The obtained cement has among many other characteristics high resistance to compression, abrasion, and flexion with which its applications further includes the common or already known, applications using lower thicknesses with high resistance and with the benefit of permeability than those of the state of the art. Said applications are mentioned with illustrative but no limitative purposes of the invention, among others we can find paving of freeways, roads, highways, docks, maritime platforms, runways, barren peaks, etc. All of these applications cause not only structural and economic benefits but also environmental great benefit.

Additive of the present invention by being combined with cement, water, and granular materials provides to the obtained cement and its manufacturing and placing process the following characteristics:

Unlike the other additives, the additive of the present invention can be added to the concrete admixture at the production plant before its transporting, instead of mixing it in situ. That is, the additive dose can be made at the concrete plant or at the construction site. Consequently, it is possible to pack the added additive in different volumes, also carry it in tankers.

Setting time is wider than those of the permeable concretes in the state of the art, allowing the concrete is placed early in the morning or in hot weather, without affecting the product malleability and preventing the constant addition of water during its placement, situation that causes going out of technical specifications that affect the correct behavior of concrete and stability thereof.

Further, with the additive of the present invention is no need to cover the concrete surface with polyethylene sheets for curing; this benefits the process since removing the polyethylene before time causes cracks and crumbling of the surface. As well as it is achieved that superficial curing and setting of permeable concrete with improved properties is smooth and even.

Before the setting step, permeable concrete with improved properties including the additive of the present invention has a remarkable superior plasticity and handling than prior art concretes.

The additive of the present invention is used in a substantially lower percentage than the additives for permeable concrete already known. To reach resistances at least 300 Kg/cm² in the concrete product of the state of the art is added 25% less additive relative to the amount required for known additives for concrete admixtures of prior art.

The additive of the present invention can be mixed with any kind of stony aggregate as well as with different types of cement currently existent without constrains.

In the process of placing permeable concrete with improved properties including the additive of the present invention, there is no need to wet the base besides, the mixture requires a lesser quantity of water than known concretes.

Permeable concrete with improved properties including the additive of the present invention which is a product able to setting under water, therefore it can be used for hydraulic engineering or offshore works.

The present invention provides an additive formulation for manufacturing permeable concretes with improved properties; the formulation comprises the following ingredients: about 33.70 to 54.90% water; about 0.30 to 0.50% defoamer; about 0.30 to 0.40% bactericide; about 0.30 to 0.50% polyglycol; about 7.20 to 24.00% of a combination of emulsifiers; about 15.50 to 17.00% moisturizer; about 20.8 to 22.90% dispersant; and, about 0.70 to 1.00% biopolymer.

According to the above description, the preferred embodiment and function of each product from the additive of the present invention are provided below:

Defoamer; A non-ionic surfactant, i.e., a polyester siloxane copolymer, is used in very low amounts from 0.30 to 0.50% from the total additive; it brings down all foam in the admixture and prevents formation of new bubbles that damage cement and diminish both the compressive strength and cross-breaking strength.

Bactericide; In a preferred embodiment of the invention, the bactericide used is isothiazolidone, which forms part of the additive for permeable concretes of the present invention to preserve the product in the packing with very low toxicity and high effectiveness, preserving the packed product at least for one year without decay, avoiding bacterial development.

Polyglycol; Organic compound with unique properties of low polydispersion that lubricates the walls of the mixture container avoiding that the permeable concrete sticking to the walls, preferably using polyethyleneglycol.

Combination of emulsifiers; The additive of the present invention includes preferably a combination of 2 emulsifiers, namely: 3.60 to 12% sodium arylsulfonate and 3.60 to 12% alkylammonium salt of the additive composition; these emulsifiers encapsulate the cement preventing water evaporation; this fact remarkably influence in the compression strength and cross-breaking strength since moisture remains in cement and water is not absorbed by the base or evaporated; then there is no need to use polyethylene sheets as discussed above.

Moisturizer; Moisturizer included in the additive of the present invention consists preferably of a metacrylic acid copolymer which brings handling and molding properties to cement without losing its characteristics, which is useful considering that the additive can be added at the concrete production plant and it can be placed regardless of the weather without losing the mentioned properties.

Dispersant; The additive of the present invention in a preferred embodiment includes polyether with carboxylic groups and long chain of ethylene oxide as a dispersant that brings fluidity to concrete without disaggregation, which produces 10% to 15% water savings. The use of polyether with carboxylic groups and long chain of ethylene oxide allows to obtain concretes with the same resistance than prior art concretes but using less cement in the mixture, or, a greater resistance using the same quantity of cement than in concrete of the state of the art.

Biopolymer; The biopolymer included in the preferred embodiment of additive for permeable concretes of the present invention consists in diutan gum, that makes the concrete able to be cast under water without the cement being totally disaggregate or without sedimentation of stony aggregates.

According to the present description, an additive formulation for manufacturing permeable concretes is presented, it is important to mention that percentage of each ingredient may vary and depend on the required properties according the use or application of the final product. Therefore, there is a range of permeable concretes with different mechanical properties required for the product in each step before, during, and after of the setting and it produced from the referred formulation:

| Ingredient | Type of ingredient | % Minimum | % Maximum |
|---|---|---|---|
| Water | Additive Diluent | 33.70 | 54.90 |
| Polyesther siloxane copolymer | Defoamer | 0.30 | 0.50 |
| Isothiazolidone | Bactericide | 0.30 | 0.40 |
| Polyethylene glycol | Polyglycol | 0.30 | 0.50 |
| Sodium arylsulfonate and alkylammonium salt | Combination of emulsifiers | 7.20 | 24.00 |
| Metacrylic acid copolymer | Moisturizer | 15.50 | 17.00 |
| Polyether with carboxylic groups and long chain ethylene oxide | Dispersant | 20.8 | 22.90 |
| Biopolymer | Diutan gum | 0.70 | 1.00 |

Following a procedure to prepare the additive of the invention and comparative tests to enhance the benefits of the present invention are detailed. All references made to the following examples are for illustration purposes, and they must not be considered as exhaustive or limiting, but only illustrative of some embodiments of many that might be contemplated by the present invention.

Preparation of the Additive for Manufacturing Permeable Concretes

Formulation of the preferred embodiment was carried on pursuant the following method, which steps are:

1. Providing 50% (16.85 to 27.45%) of the water to be used in a stainless steel container, which is placed on a high-speed dispersant.
2. Stirring at 2000 rpm, and adding 0.30 a 0.50% defoamer.
3. Reducing seed to 400 rpm for a 25 to 30 min period to obtain an emulsion.
4. Reducing speed (stirring) to 300 rpm and incorporating 50% (from 16.85 to 27.45%) of the remaining water along with 0.30 a 0.40% bactericide and 0.30 to 0.50% polyglycol.
5. Increasing speed to 600 rpm for 30 minutes.
6. Reducing speed to 400 rpm, adding moisturizer and dispersant, and keeping the same speed for 15 minutes.
7. Adding emulsifiers and biopolymer and continue stirring for 30 minutes.

Example 1

Evaluation of Moisture Absorption

Figure 2:
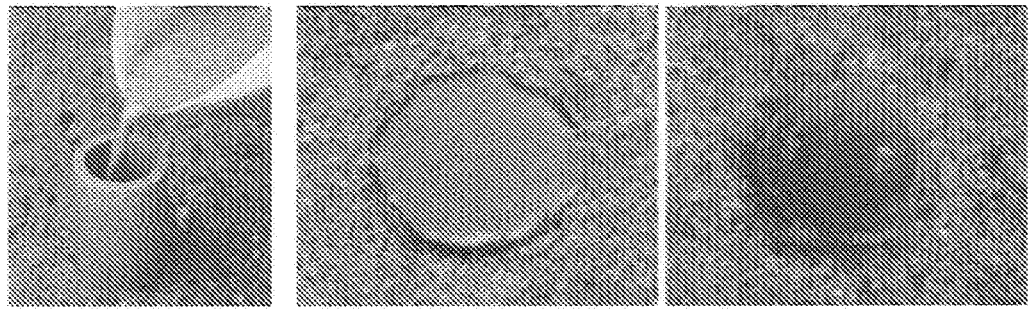
FIG. 2 illustrates a comparative showing condensation of water on cement with an additive of the state of the art versus cement with additive of the present invention, which shows how moisture is maintained.

Moisture absorption of a cement mixture with additive of the invention and a cement mixture with additive of the state of the art were valuated. Said evaluation was visual and tactile. The test consisted of placing a sample of each type of cement (one with the additive of the invention and the other with the additive of the state of the art) in two small and short cylindrical containers with an about 25 ml volume leaving them at rest for 10 minutes. As time passed, the surface of the sample with the additive of the present invention was smooth and water-free, on the other hand, the sample with additive of the prior art accumulated a considerable quantity of water on the surface resulting from water condensation or water evaporation from the concrete mixture. Allowing water evaporation influences importantly in the compression strength and cross-breaking strength of permeable concretes. Test results are shown in FIG. 2.

Example 2

Evaluation of Curing and Setting

Figure 3:
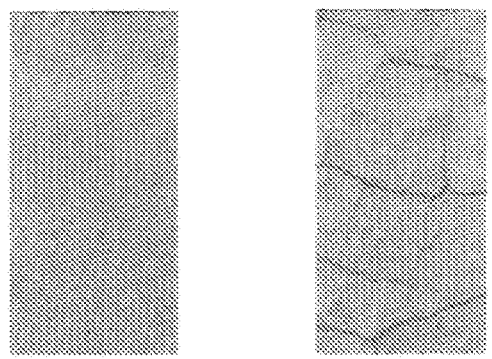
FIG. 3 shows a comparative of curing and setting on surface of two permeable cements, one with the additive of the state of the art and the other with the additive of the present invention.

Curing and setting were evaluated in a sample of a cement mixture using additive of the present invention and a sample from a cement mixture with additive of the state of the art. Said evaluation was visual and tactile. The test consisted of placing a sample of each type of cement in two short rectangular containers with an about 40 l volume and leaving them at rest until setting. In the state of the art concrete is covered with polyethylene sheets during curing/setting, for this evaluation both concretes remained uncovered. As time passes the surface of the sample of cement including additive of the present invention remains smooth and without cracks of fractures, on the other hand, the sample with prior art additive placed without polyethylene sheets showed an important quantity of cracks and fissures on the surface of the sample. Test results are shown in FIG. 3.

Example 3

Evaluation of Underwater Casting and Setting

Figure 4:
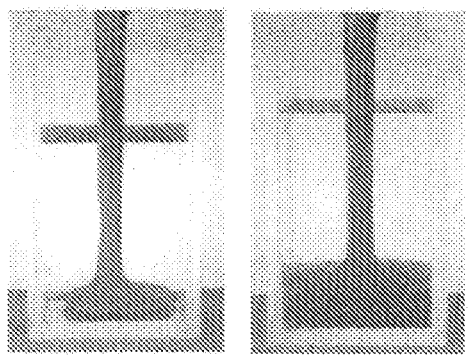
FIG. 4 shows a comparative of underwater casting and setting between two permeable cements, one with the additive of the state of the art and the other with the additive of the present invention.
Figure 4:
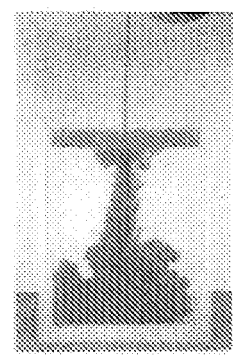

Underwater casting and setting of a mixture of cement with the additive of the present invention and a mixture of cement with an additive of the state of the art were evaluated. Said evaluation was visual. The test was carried out by pouring a sample of each type of cement in two containers with considerable height with a 20 l volume approximately. ⅔ of said containers were filled with water and their behavior was evaluated since the mixture of concrete enters into contact with the water. After visual evaluation of both samples it is found that the mixture of cement with the additive of the present invention is not mixed or disaggregated with the water and sedimentation of stony aggregates is not find. On the other hand, the sample with prior art additive is disaggregated and diluted with water, and an important quantity of stony sediments from the concrete mixture was observed. Test results are shown in FIG. 4.

Example 4

Evaluation of Compressive Strength and Cross-Breaking Strength

Compressive strength and cross-breaking strength of cement using the additive of the present invention and cement with an additive of the state of the art were evaluated. Concretes were prepared by adding additive, cement, water and stony aggregates, the amounts thereof are indicated in the table below. The additive added to the concrete with improved properties was prepared pursuant the method of preparing set out herein above.

Concretes were submitted to compressive strength and cross-breaking strength of the material as follows.

Permeable concretes were also visually inspected before, during, and after tests to valuate some signs of their different behaviors.

Manufacturing Cylinders for Compressive Strength and Cross-Breaking Strength Tests As it is already known, the most common way to determine concrete resistance and judge the quality of concrete is by testing specimens under compression and cross-breaking strength. Specimens (cylinders) must be made properly pursuant specifications for molding, compaction, flush and identification of the same.

a) Sampling

This is probably the most important step of this determination because if the sampling is not representative and reliable, all the steps following the sampling will be seriously affected.

Before collecting samples, the equipment must be in optimal use conditions, clean and complete. In addition all surfaces to be in contact with the concrete must be wet, in the case of a wheelbarrow a rubber is put on its surface to prevent water absorption and with the same rubber the sample is covered.

b) Sampling Procedure

The sample must be taken from at least three different portions of the load, being sure that the sample is taken at the middle third of the same. The sample can be obtained by passing the container (wheelbarrow or bucket) through the discharge jet, once obtaining the needed portions for the sample it is vigorously mixed with the bucket until a homogenous mixture appearance. If the sample is obtained from a mixer, the sample is poured into the wheelbarrow and mixed vigorously until obtaining a homogeneous sample.

c) Equipment for Manufacturing the Cylinders

For carrying out the preparation of the cylinders the following is required: a timer with a minimum accuracy of 0.2 seconds; a bullet tip rod of steel, round, smooth, with about 1.6 cm in diameter and about 60 cm long, with both ball-shaped ends must be 1.6 cm in diameter; a rubber mallet of 1 kg weight; a metal, rectangular bucket with about 1.5 liters capacity; a metallic wheelbarrow of 30 liter capacity and equipped with pneumatic tire; a vibrocompacter Wacker WP 1550 vibratory plate, with a gasoline, air cooled internal combustion engine, 4500 watts at 3600 rpm, 20 cm compacting depth.

d) Cylinder Molds

Since the vibrocompacting plate used it has a 20 cm compacting depth, the cylindrical molds are 15 cm in diameter and 18 cm in height, additionally the equipment compacts the material by 20%; then the cylinders already compacted are 14.7-15.3 cm in height. In addition, a slenderness factor for compression tests must to be applied. Cylindrical molds must be completely closed, once they are completely closed, the cylinder inner walls are lightly impregnated with an release agent.

In FIG. 1 metallic cylinders for compression tests are shown.

e) Procedure for Preparing the Concrete Specimens

Before of preparing the concrete specimens, the following items must be checked:

the molds must be well closed;

the molds must be well adjusted to prevent them to get loosed or ill-fitted;

a release agent must be applied to the mold inner surfaces;

the equipment must be cleaned and complete.

f) Filling the Mold and Compacting Process

Once the mixture reaches the proper conditions proceeding to prepare the concrete specimens, placing the molds on the surface in the location where they will be stored and proceeding with the properly mixed, homogenous sample to manufacture each one of the cylinders as follows:

1) Placing a plastic sheet on the wheelbarrow to prevent water absorption, the same plastic sheet will be used to cover the concrete.

2) Once the sample is placed on the wheelbarrow, it must be perfectly mixed with the bucket to homogenize the mixture.

3) When pouring each layer of the sample the bucket has to be moved around the cylinder's edge as the sample goes downloading in order to ensure a proper distribution.

4) The mold must be filled in three sections trying to pour the same volume into each one: the first section is to be filled up to one third of the cylinder's total volume and the mixture is to be accommodated with the bullet tip rod trying to fill up the empty gaps (only accommodating, no compacting or compressing). Repeat the same procedure for other two sections, but in the last one only fill up to the higher level of the cylindrical mold.

5) Furring to remove excess of the sample by passing the bullet tip rod in a zig-zag movement, this to be as evenly as possible.

6) Once the mold is filled up, the base with caps is placed on the mixture surface that is in the cylindrical mold; two strokes are given to the corner of the base with caps to seat the caps.

7) Once the cylindrical molds have the bases with caps are passed 3 times to the vibro-compacter to compact the cylinders, volume diminishing by 2.7-3.3 cm after compaction.

8) Once the specimens are finished, molds must be immediately covered with a plastic sheet to prevent water evaporation.

9) Specimens should keep in molds for at least 20 hours but no more than 48 hours. Within this period of time they should be released and transported immediately to continue curing until the specified time.

10) Specimens will be left on a curing chamber until they undergo compression tests at days 7, 14 and 28.

Ingredients and amounts for preparing the concrete are indicated in the following table.

| Ingredient | Permeable concrete with additive of the present invention | Permeable concrete with prior art additive |
|---|---|---|
| Water | 88 l | 150 l |
| Cement | 350 Kg | 360 Kg |
| Stony Aggregate | 1 m³ | 1 m³ |
| Additive | 7.2 l | 36 l |

Results of measurements for permeable concretes are shown below:

| Test type | Permeable concrete with additive of the present invention | Permeable concrete with prior art additive |
|---|---|---|
| Compressive strength | 291.3 Kg/cm² | 250 Kg/cm² |
| Cross-Breaking strength | 43.1 Kg/cm² | 35 Kg/cm² |

Additive of the present invention allows producing permeable concretes with large benefits besides the already mentioned herein above, among which we can add the continuous and direct recharge of groundwater, decrease of ponding or water accumulation, low cost of installation compared with sewage systems, it allows a permeability of 100 to 200 l/m²/minute. Benefits from using the cement additive of the present invention are not only economic and structural as described, but they promote sustainably development and environmental awareness.

It is important to mention that permeable concretes including the additive of the present invention not only are applicable to uses mentioned herein such as paving of freeways, roads, highways, docks, maritime platforms, runways, jetties, etc., also would be useful and perfectly applicable to light traffic streets, walking paths, sidewalks, bicycle paths, parking lots, parks, pedestrian areas, yards, pathways, etc.

The above is a detailed description of an embodiment of the invention. It will be appreciated that, although in this document specific embodiments of the invention have been disclosed, with illustration purposes, several modifications without being apart of the scope and spirit of the invention. The description of any patent or any other publication cited herein is incorporated as a reference.

The invention claimed is:

1. An additive for manufacturing permeable concretes with improved properties, wherein the additive comprises a composition of: 33.70 to 54.90% water; 0.30 to 0.50% defoamer; 0.30 to 0.40% bactericide; 0.30 to 0.50% polyglycol; 7.20 to 24.00% of a combination of emulsifiers; 15.50 to 17.00% moisturizer; 20.8 to 22.90% dispersant; and 0.70 to 1.00% biopolymer.

2. The additive for manufacturing permeable concretes according to claim 1, wherein the defoamer is a polyester siloxane copolymer.

3. The additive for manufacturing permeable concretes according to claim 1, wherein the bactericide is isothiazolinone.

4. The additive for manufacturing permeable concretes according to claim 1, wherein the polyglycol is polyethylene glycol.

5. The additive for manufacturing permeable concretes according to claim 1, wherein the combination of emulsifiers consists of sodium arylsulfonate and alkylammonium salt.

6. The additive for manufacturing permeable concretes according to claim 5, wherein the additive contains 3.60 to 12% of sodium arylsulfonate and 3.60 to 12% alkylammonium salt.

7. The additive for manufacturing permeable concretes according to claim 1, wherein the moisturizer is methacrylic acid copolymer.

8. The additive for manufacturing permeable concretes according to claim 1, wherein the dispersant is polyether with carboxylic groups and poly(ethylene oxide) chain.

9. The additive for manufacturing permeable concretes according to claim 1, wherein the biopolymer is diutan gum.

10. A method for manufacturing an additive to manufacture permeable concretes with improved properties, wherein the method comprises the steps of:
   a) placing in a stainless steel container, equipped with a high-speed disperser, 16.85 to 27.45% water to be used;
   b) stirring at 2000 rpm while adding 0.30 to 0.50% defoamer;
   c) raising stirring speed to 400 rpm for 25 to 30 minutes to obtain an emulsion;
   d) reducing stirring speed to 300 rpm and adding 16.85 to 27.45% remaining water along with 0.30 to 0.40% bactericide and 0.30 to 0.50% polyglycol;
   e) increasing stirring speed to 600 rpm and holding it for 30 minutes;
   f) reducing stirring speed to 400 rpm and adding 15.50 to 17.00% moisturizer and 20.8 to 22.90% dispersant and holding the same stirring speed for 15 minutes;
   g) adding 7.20 to 24.00% of a combination of emulsifiers and 0.70 to 1.00% biopolymer and continue stirring for 30 minutes.

11. The method for manufacturing an additive according to claim 10, wherein the defoamer is a polyester siloxane copolymer.

12. The method for manufacturing an additive according to claim 10, wherein the bactericide is isothiazolinone.

13. The method for manufacturing an additive according to claim 10, wherein the polyglycol is polyethylene glycol.

14. The method for manufacturing an additive according to claim 10, wherein the combination of emulsifiers consists of sodium arylsulfonate and alkylammonium salt.

15. The method for manufacturing an additive according to claim 14, wherein the combination of emulsifiers comprises 3.60 to 12% sodium arylsulfonate and 3.60 to 12% alkylammonium salt.

16. The method for manufacturing an additive according to claim 10, wherein the moisturizer is methacrylic acid copolymer.

17. The method for manufacturing an additive according to claim 10, wherein the dispersant is polyether with carboxylic groups and poly(ethylene oxide) chain.

18. The method for manufacturing an additive according to claim 10, wherein the biopolymer is diutan gum.

19. A concrete and/or stony aggregate for manufacturing permeable concrete comprising the additive according to claim 1.

* * * * *